United States Patent [19]

Symons

[11] Patent Number: 5,343,624
[45] Date of Patent: Sep. 6, 1994

[54] MEASUREMENT TOOL

[75] Inventor: Daniel A. Symons, Marquette, Mich.

[73] Assignee: American Airlines, Inc., Dallas, Tex.

[21] Appl. No.: 935,583

[22] Filed: Aug. 26, 1992

[51] Int. Cl.$^5$ ............................................. G01B 5/14
[52] U.S. Cl. ................................... 33/810; 33/555.1; 33/546
[58] Field of Search ............... 33/810, 811, 812, 836, 33/833, 555.3, 555.1, 545, 546, 557–554, 826, 828, 831, 555.2, 555.4, 501.02

[56] References Cited

U.S. PATENT DOCUMENTS

| 490,860 | 1/1893 | Snoeck . | |
|---|---|---|---|
| 597,335 | 1/1898 | Spalding . | |
| 878,439 | 2/1908 | Wagniere | 33/555.3 |
| 2,391,020 | 12/1945 | Jackman | 33/555.1 X |
| 2,515,214 | 7/1950 | Goldberg | 33/555.1 X |
| 2,560,571 | 7/1951 | Hawkins | 33/833 |
| 2,611,187 | 9/1952 | Keene et al. . | |
| 2,844,880 | 7/1958 | Brunner | 33/555.3 |
| 2,855,687 | 10/1958 | Price | 33/555.3 |
| 2,957,247 | 10/1960 | Brown et al. . | |
| 3,648,377 | 3/1972 | Witzke | 33/555.1 |
| 3,942,253 | 3/1976 | Gebel | 33/551 X |
| 4,631,831 | 12/1986 | Bacher et al. . | |

FOREIGN PATENT DOCUMENTS

| 643806 | 5/1928 | France | 33/555.3 |
|---|---|---|---|
| 68436 | 10/1944 | Norway | 33/833 |

Primary Examiner—William A. Cuchlinski, Jr.
Assistant Examiner—Alvin Wirthlin
Attorney, Agent, or Firm—Johnson & Gibbs

[57] ABSTRACT

A measurement tool adapted for measuring surfaces of a known desired curvature and specifically grooves, holes, chips, gouges, chafing and/or out of round areas therein. The measurement device is constructed with an attachment member having a curvature matching the "set up" curvature of the part to be measured. The measuring member or probe, is sharpened to permit it to extend through an aperture formed in the attachment member for facilitating its initial setting relative to the attachment member and the surface to be measured. Any movement of the probe during measurement is then a manifestation of a deviation from the original "set up" curvature.

18 Claims, 2 Drawing Sheets

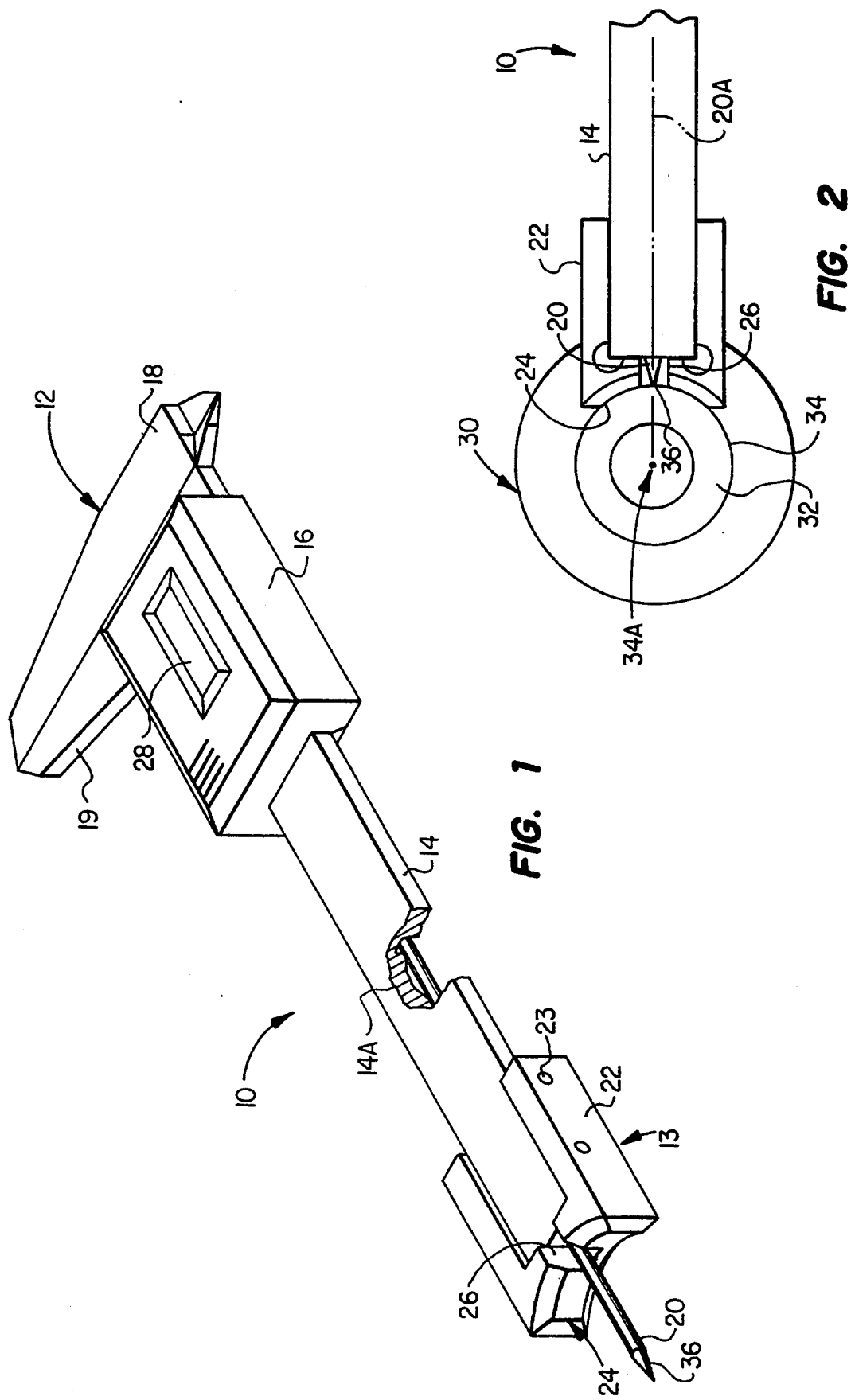

MEASUREMENT TOOL

BACKGROUND OF THE INVENTION

1. Field of the Invention

The present invention relates to measurement devices and, more particularly, to a caliper measurement assembly utilizing an attachment member specifically adapted for precise manual measurements of a known curvature.

2. History of the Prior Art

Measurement systems of varying degrees of accuracy date back into technological antiquity. Such measuring devices often utilize simple indicia indicating the distance measured. These devices include simple rulers and tape measures as well as more mechanically complex gauges and calipers of conventional design. Machining precision and engineering creativity have produced a wide variety of precision instruments capable of manually measuring minute distances.

The availability of precision measurement devices has, in turn, revolutionized the machining industry and the mechanical measuring art itself by providing simple, reliable devices that are capable of precision measurements on a relatively small scale. The magnitude of measurable distances has decreased as machining precision has increased. Several prior art patents reflect this progress. An early version of a gauge adapted for measuring the depth of a hole and the length or width of an article is seen in U.S. Pat. No. 597,335 which issued in 1898 entitled "Micrometer Depth Gage." The device set forth and shown therein incorporates a screw-thread adjustment member with preselected indicia showing the distance of movement of the adjustment member relative to a flat base which is used to position the device for measurement. Measurements are manually made by utilizing the incremental movement of the screw-thread mounting and the indicia formed upon the body relative thereto.

Another example of measurement technology from the last century is seen in U.S. Pat. No. 490,860, an earlier version of a precision "depth gauge" which was patented in 1893. This device was said to be capable of measuring the diameter of holes as well as the depths of different parts of a cavity of unequal depth by utilizing a tapered spindle which extended from a flat positioning surface. Again, preselected indicia were provided on the body of the depth gauge for visual observation of the measured diameter and depth of the hole by the user.

U.S. Pat. No. 2,611,187 was issued in 1952 for a "Keyway Location Gauge." In this particular reference, it is seen that specific adaptations of the earlier depth gauge were utilized for measuring the relationship between the centerline of a keyway with respect to the axis of a shaft in which the keyway was located. The gauge of this particular invention was to be constructed with "V-shaped" blocks forming an angulated positioning surface. The "V" blocks were adapted to engage a round shaft so that the apex of the "V" would be precisely parallel with the axis of the shaft for purposes of measurement. An extendable element fit into the slot, and preselected indicia measured any misalignment between the axis of the slot and the axis of the shaft.

More conventional depth measurement devices also include the assembly shown in U.S. Pat. No. 4,631,831. This 1986 patent teaches a tread depth probe for manually measuring the depth of a tread groove in a tire from a generally planar position on the surface of a tire. This particular device then indicates the result of that measurement on a computerized display screen. As was common with earlier vintage depth gauges, a probe is extended from a flat surface of the gauge into the region to be measured, and the displacement of the probe is precisely measured and displayed to the user.

It may be seen that the measurement of various depths, and distances related thereto, is easily determined by the use of gauges and calipers once a positioning plane, or "base line", is provided. In the prior art discussed above, the base line is either a planar region or is formed from angulated blocks for "centering" upon the surface to be measured. While effective in centering items on a shaft and/or measuring the diameter or depth of holes or cavities in a flat surface, none of the prior art gauges are specifically adapted for the precision measurement of deviations from the curvature of a round surface. The manual measurement of the preciseness of the curvature of a round surface, however, may often be more critical an operation than the measurement of a flat surface. For example, in mechanisms utilizing round parts rotating at high speeds, a critical measurement is whether the surface of such parts is "out of round". A precise manual measurement of this nature would be difficult, if not impossible, with prior art gauges and calipers of the type discussed above, thereby necessitating the use of a more complex and expensive measurement system. More complex devices, such as optical systems, are capable of such precision measurements, but these are often cost prohibitive and time-consuming.

In the air transportation industry, the demands for economical, precision measurements within close tolerances are well known. A multitude of extremely precise measurements must be taken frequently upon a myriad of aircraft parts in order to maintain aircraft performance and safety margins. For example, safety regulations require that the surfaces of certain round areas be kept within precisely specified tolerance limits. The usual means for measuring such surfaces is with conventional measuring devices of the type discussed above. Using such devices, however, it is difficult to obtain repeated accurate measurements of objects having a small radius of curvature which extends over a large area. Such areas may include shafts and the outer rim of aircraft wheel structures, where there is biaxial curvature. One axis of wheel rim curvature is that of the wheel radius itself (often measured in feet), while a second axis of curvature is that of the lip or rim of the wheel, often measured in inches. When attempting to measure such regions, it is difficult to establish a zero reference point (base line) for the measurement probe, and even more difficult to maintain the measurement probe in the proper biaxial orientation during manual measurement operations. This task becomes extremely troublesome when the operation must be consistently repeated at multiple points around the rim of the wheel.

The present invention overcomes the problems of the prior art by providing a measuring device attachment member which may be specifically configured for engaging regions of known curvature of certain parts. The attachment member includes a surface having a mating configuration to that of the part being measured. In this manner, the measuring device can abuttingly engage the surface being measured in general conformity therewith. Thus a base line is easily established, and the probe can be readily calibrated for a zero-deviation reading ("zeroed out") at the initial measurement position. Manual stabilization of the measuring device during measurement operations is also greatly enhanced, as the proper biaxial orientation is more easily maintained. Additionally, multiple measurements may be accurately and consistently repeated, for example, around the entire circumference of a wheel or along the entire length of a shaft for the detection of chips, gouges and other "out of round" regions upon the engaged surface. The attachment member may also be incorporated in automated systems, as set forth herein.

SUMMARY OF THE INVENTION

The present invention relates to measurement devices. More particularly, one aspect of the invention includes a measurement device having an attachment member constructed with a curvature for matingly engaging the part to be measured. The attachment member contains an aperture adapted for receiving a measurement probe therethrough, for positioning and stabilizing the probe during measurement operation, and for providing a precise initial set up position (base line) of the probe enabling the measurement device to be initially "zeroed out".

In another aspect, the present invention includes a measurement device for curved surfaces comprising a depth gauge having a moveable probe which may be extended to measure a distance and an attachment member which is constructed with an outwardly facing curved surface which matches the curvature of the surface to be measured. Means are provided for mounting the attachment member upon the measurement device in association with the extendable probe for use therewith and for defining the desired curvature of the surface to be measured relative to the end of the probe. A probe setting block is also constructed with the desired curvature to be measured, and is adapted for matingly engaging the attachment member and permitting the probe to be initially positioned thereagainst. This positioning step permits the probe to move outwardly from the measuring device during the measurement operation when any undesirable discontinuity in the surface region of the measured surface is encountered. The setting block may include a generally cylindrical body portion having a radius of curvature matching the desired curvature of the surface to be measured.

In another aspect, the invention includes a method of measuring a curved surface for detecting non-uniform portions thereof comprising the steps of providing a probe-type measurement device for measuring distances, providing an attachment member for use in association with the probe, and forming a curvature on the attachment member matching the desired curvature of the surface to be measured. The attachment member is then secured on the measurement device with the curved surface facing outwardly therefrom and in association with the probe. Means are then provided for passage of the probe through the outwardly facing curved surface for measurements relative thereto. A setting block is provided for use with the attachment member, the setting block having a curvature matching the desired curvature of the surface to be measured. The attachment member is then positioned in flush engagement with the curved surface of the block and the probe is brought into abutting engagement with the setting member for zeroing out the measurement device in preparation for measuring the surface to be measured and detecting any deviations from the desired curvature thereof.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a perspective view of one embodiment of a measurement tool constructed in accordance with the principles of the present invention;

FIG. 2 is a top plan, fragmentary view of the engagement end of the measurement device of FIG. 1 illustrating the positioning of the attachment member and extendable probe contiguous to a setting-block;

DETAILED DESCRIPTION

Figure 3:
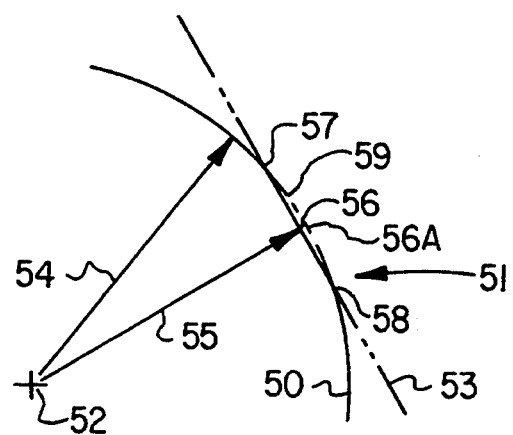
FIG. 3 is a diagrammatic schematic of the measurement angles addressed by use of the measurement device of FIG. 1.

Referring first to FIG. 1, there is shown one embodiment of a measurement tool 10 constructed in accordance with the principles of the present invention. The tool 10 of FIG. 1 includes, in part, a conventional "probe type", vernier caliper 12 which forms a depth gauge 13 in a lower, handle portion 14. Indicia is provided in the form of a digital display 28 incorporated into the caliper 12 to display measurement readings. The handle portion 14 depends from an upper body section 16 which supports the digital display 28. The upper body portion 16 is slidable along the central handle portion 14 by the application of pressure from the fingers of the hand of a user. A stationary headpiece 18 and a movable jaw 19 upstand from the handle portion 14 and may be separated for measuring the thickness of an object. A probe 20 depends from the upper body portion 16 through the handle section 14 (as shown in the cut-a-way section 14A) for extending therefrom to measure distances such as depth. An operator may extend the probe 20 by exerting a downward finger pressure on the upper body portion 16, relative to the handle 14. In an alternative embodiment, the probe 20 may be biased outwardly and extended by a spring assembly. Likewise, a variety of probe-type measurement devices could be used in accordance with the principles of the present invention.

The elements described above comprise ordinary parts of a conventional digital measurement device of the type in commercial use today. While effective in measuring the thickness of objects and the depth of holes in flat surfaces, such measurement devices are not effective in locating and measuring small irregularities in curved surfaces as described herein.

In accordance with the teachings of the present invention, an attachment member 22 is secured to the lower end of the handle section 14 of the measurement tool 10. Attachment member 22 has an outwardly facing, curved end region 24 and an aperture 26 formed therein. Aperture 26 is aligned in registry with probe 20 to allow its passage therethrough. The end 36 of probe 20 is tapered, to facilitate measurements. Movement of the probe 20 through aperture 26 then provides a readout of distance on the digital display 28 shown in the upper body portion 16.

Still referring to FIG. 1, the tool 10 is specifically adapted for measuring the precision and uniformity of curvature of a surface having a defined radius. The known radius of curvature is, in fact, used to form the curved end portion 24 of attachment member 22. With the curved end portion 24 constructed to matingly engage and match the desired curvature to be measured, the probe 20 may be used to detect any discontinuities such as chips, gouges, or "out-of-round" regions therein. The attachment member 22 is secured to the end of caliper 12 by threaded fastener 23, but other attachment techniques could likewise be used. It is, of course, preferable to utilize an attachment device such as threaded fastener 23 permitting removal of the attachment member 22 from the caliper 12 to permit its replacement with an attachment member having a different curvature to measure another defined part.

Referring now to FIG. 2, the attachment member 22 is shown disposed in abutting engagement with a setting block 30. The setting block 30 is constructed with an upper cylindrical region 32 having a precisely ground outer surface 34 that defines the known, or "desired" curvature to be engaged by the surface 24 of attachment member 22. In this manner, the tapered end 36 of probe 20 can be precisely positioned so that, as long as it remains aligned with the curved surface 24 of attachment member 22, it defines the desired curve to be measured as the tool 10 is moved along the surface to be measured. From this position the tool 10 may be zeroed out, and as long as the probe 20 remains in alignment with the surface 24 of attachment member 22, no reading may be seen on the digital display 28. When the probe 20 encounters indentations in the measured surface the probe 20 will extend beyond the curve initially defined by the cylindrical surface 34 and generate a reading on the digital display 28. Small protrusions or burrs on the surface to be measured may cause the attachment member 22 to separate slightly from the surface thereby creating a gap and causing the probe to extend. Thus protrusions will also generate a reading on the digital display 28.

Still referring to FIG. 2, it may be seen that an axis 20A of probe 20 passes through the radial center 34A of cylindrical surface 34, and therefore, through the radial center of the curved surface to be measured. Therefore, any discontinuities which move the probe in either direction are measured as radial discontinuities. As the tool 10 is moved around the surface to be measured, such radial discontinuities may thus be quickly detected.

Referring now to FIG. 3 there is shown a diagrammatic schematic of the measurement angles and surface curvature addressed by the present invention. The curved surface 50 being measured has a center of curvature 52. A phantom line 53 is shown lying across an "out of round" region 51 of the surface 50. The radius of curvature of the surface 50 is shown by an arrow 54, and the radial distance from the radial center 52 to a point 56 orthogonal to the phantom line 53 is shown by arrow 55. The "out of round" region defined by phantom line 53 is bounded by points 57 and 58 of surface 50. The distance between points 57 and 58 is, in the present illustration, on the order of one-half the radius 54. It may be seen that even though the tangential dimension of the "out of round" region is an appreciable part of the diameter (on the order of 25%) of the surface 50, the radial deviation from the desired surface, as shown by the distance between phantom line 53 and dotted circle 59, is quite small. In fact, the largest radial deviation, the distance between point 56 on phantom line 53 and point 56A on the dotted circle 59, is still but a small fraction of the diameter and may not be visually discernable. The combination of the large surface area affected, and the small radial deviation explains why the use of a prior art measuring device with a planar base could inherently miss or provide erroneous readings when such "out of round" regions are encountered. The planar base of such a device could engage the surface 50 along line 53 and record no radial deviation where, in fact, a radial deviation of the size described above does exist.

In order to make an accurate reading, the curvature of the measuring member must match the curvature of the surface being measured. In the illustration of FIG. 3, that curvature is defined by the radius 54 producing dotted line 59. By utilizing attachment member 22 of the present invention, the pointer 20 may be zeroed out when it is aligned with the curved surface 24, and thereby utilized to detect deviations such as that shown to exist between points 56 and 56A.

Figure 4:
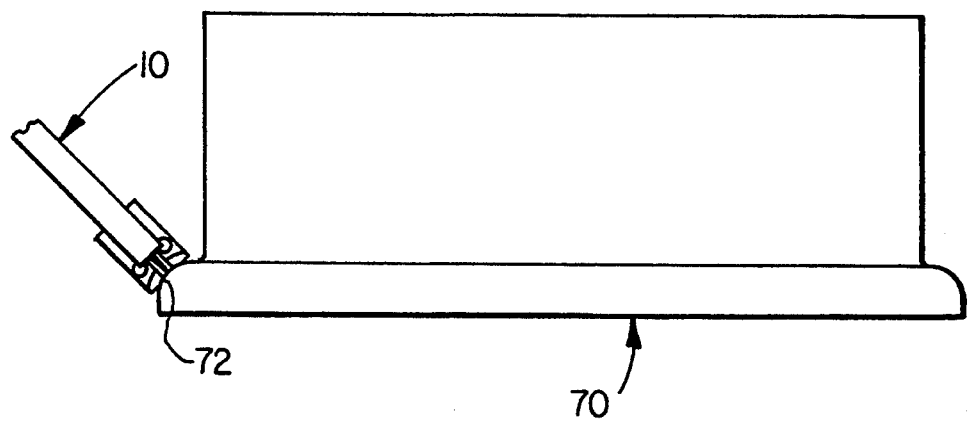
FIG. 4 is a side view illustrating one application of the measurement device of the present invention in the measurement of an arcuate surface of a wheel rim.

Referring now to FIG. 4 there is shown the use of the tool 10 of the present invention in measurement of a wheel rim 70. The wheel rim 70 has an arcuate bead section 72 formed with a predefined radius, the axis of which is orthogonal to the axis defining the major curvature of rim 70 (herein referred to as a "biaxial curvature"). One particular application of the present invention is the measurement of the curvature of the small bead section 72 upon the rim 70. In the airline transportation industry, it is critical to maintain close tolerances on all working parts of the landing gear. During repeated landings, the rims of certain aircraft have been noted to manifest deteriorating wear. This wear may take the form of chaffing, gouging, or scratching of the rim surfaces which must be carefully monitored. The wheel surfaces are thus usually scheduled to be carefully inspected and measurements taken to determine if the wear is within specified limitations. If the depth of a scrape, gouge, or scratch exceeds the allowed depth, then the wheel must be repaired or replaced.

The present invention provides an economical and time effective method of manually measuring large surfaces having a defined curvature (such as a biaxial curvature) not easily measured with conventional measurement devices. An operator can quickly mount onto the handle portion 14 the select attachment member 22 with a curved surface 24 that matches the curvature of the bead rim 72. This attachment member may come from an inventory of attachment members of graduated curvatures. The operator can then easily zero out the measuring device with the setting block 30 having a curvature that matches the curvature of the part to be measured, such as bead rim 72. After placing the curved surface 24 in contact with the bead rim 72, the operator may rotate the tool 10 along the extent of the curved surface of the bead rim 72. The matched curvatures of the attachment member 24 and the bead rim 72 enable the operator to easily maintain the tool 10 in the proper orientation to measure radial deviations from the desired curvature. Any irregularities or "out of round" conditions cause a reading to be displayed on the digital display 28. The operator may then ascertain whether or not the displayed reading is within specified limits. Additionally, the operator may quickly and economically take multiple readings around the complete wheel rim 70 with repeatable accurate measurement results.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. A measuring apparatus for measuring a curved surface of known desired curvature comprising:

a measurement device having an extendable probe;

said measurement device having a means for indicating the magnitude of extension of said probe relative to said measurement device;

an attachment member having means for engaging said curved surface to be measured, said engaging means including a rigid outwardly facing surface having a curvature matching that of said known desired curvature of said curved surface to be measured; and said attachment member being mounted upon said measuring device permitting said probe to extend and engage said curved surface.

2. The apparatus as set forth in claim 1 wherein said apparatus further includes a probe setting block, a portion of which is constructed with said known desired curvature and adapted for matingly engaging said attachment member for permitting said probe to be initially positioned thereagainst, thereby calibrating said indicating means for a zero-deviation reading and permitting said probe to extend outwardly from said measurement device when detecting any surface region of the measured surface not conforming to said known desired curvature.

3. The apparatus as set forth in claim 2 wherein said setting block includes a generally cylindrical body portion having a radius equal to the radius of said known desired curvature.

4. The apparatus as set forth in claim 1 wherein said measurement device is constructed with an elongate handle portion which houses said probe therein, and said attachment member is secured to a first end of said handle portion in position for permitting said probe to extend therefrom.

5. The apparatus as set forth in claim 4 wherein said attachment member is constructed with at least one aperture therein adapted for positioning in registry with said probe extending from said handle portion thereby facilitating the extension of said probe therethrough.

6. The apparatus as set forth in claim 5 wherein said rigid outwardly facing surface of said attachment member forms part of a circle, the center of which is disposed in axial alignment with said probe.

7. The apparatus as set forth in claim 1 wherein said measurement device is a vernier caliper having a digital display.

8. The apparatus as set forth in claim 1 wherein said probe includes a tapered end region providing a relatively sharp point for detecting relatively small pits, gouges and non-uniform regions which deviate from said known, desired curvature of said surface to be measured.

9. A method of measuring a surface of known desired curvature for detecting non-uniform portions thereof comprising the steps of:

providing a measurement device having a probe for extending therefrom in the measurement of distances relative thereto and indicia in association with said measurement device for indicating the magnitude of extension of said probe;

providing an attachment member for said measurement device for use in association with said probe;

forming a rigid curved surface on said attachment member matching said known desired curvature of said surface to be measured;

securing said attachment member on said measurement device in association with said probe with said rigid curved surface facing outwardly therefrom;

providing means for the passing of said probe through said outwardly facing rigid curved surface for measurements relative thereto;

positioning said probe relative to said attachment member in position to detect deviations therefrom; and moving said rigid curved surface along said surface to be measured and detecting movement of said probe relative to said rigid curved surface.

10. The method as set forth in claim 9 and further including the steps of:

forming a setting block for use with said attachment member, said setting block having a generally cylindrical body portion with a radius matching that of said known desired curvature of the surface to be measured; and positioning said attachment member in flush engagement with said cylindrical surface of said setting block and positioning said probe in an abutting engagement with said setting block for zeroing out said measurement device in preparation for engaging said surface to be measured and detecting any deviations from said known curvature.

11. The method as set forth in claim 9 and further including the step of constructing said measurement device with an elongate handle portion and housing said probe therein and the step of securing said attachment member to an end of said handle portion in position for permitting said probe to extend therefrom.

12. The method as set forth in claim 11 wherein said step of providing means for the passing of said probe includes constructing said attachment member with at least one aperture and positioning said aperture in registry with said probe extending from said handle portion thereby facilitating the extension of said probe therethrough.

13. The method as set forth in claim 12 and further including the step of forming said rigid curved surface as a portion of a circle, the center of which is disposed in axial alignment with said probe.

14. The method as set forth in claim 9 and further including the step of tapering the end region of said probe to provide a relatively sharp point for detecting relatively small pits, gouges and non-uniform regions which deviate from said known curvature of said measured part.

15. A method of manufacturing a measurement device for measuring a surface for deviations from a known desired curvature, said method comprising the steps of:

providing a measurement device having a body portion and a probe adapted for extending therefrom in the measurement of distances relative to said measurement device and means for indicating the movement of said probe relative to said measurement device;

forming an attachment member for said measurement device for use in association with said probe;

forming a rigid curvature on said attachment member having a curvature matching that of said known desired curvature of said surface to be measured;

securing said attachment member to said measurement device relative to said probe for permitting said probe to engage said surface to be measured;

providing a setting block having a curvature substantially identical to said known desired curvature; and positioning said setting block against said attachment member in mating engagement with said probe and said rigid curvature for providing a zero reference point for said probe.

16. The method as set forth in claim 15 including the step of constructing said measurement device with an elongate handle portion and housing said probe therein and the step of securing said attachment member to an end of said handle portion in position for permitting said probe to extend therefrom.

17. The method as set forth in claim 16 including the steps of constructing said attachment member with at least one aperture and positioning said aperture in registry with said probe extending from said handle portion thereby facilitating the extension of said probe therethrough.

18. The method as set forth in claim 17 including the step of forming said rigid curvature surface as a portion of a circle, the center of which is disposed in axial alignment with said probe.

* * * * *